May 5, 1964 W. T. SELSTED 3,131,844

TRANSDUCING APPARATUS

Filed Feb. 5, 1962 3 Sheets-Sheet 1

WALTER T. SELSTED
INVENTOR.

BY Robert G. Clay

ATTORNEY

WALTER T. SELSTED
INVENTOR.
BY Robert G. Clay
ATTORNEY

WALTER T. SELSTED
INVENTOR.

BY Robert G. Clay

ATTORNEY

United States Patent Office 3,131,844

Patented May 5, 1964

3,131,844

TRANSDUCING APPARATUS

Walter T. Selsted, Redwood City, Calif., assignor to Ampex Corporation, Redwood City, Calif., a corporation of California Filed Feb. 5, 1962, Ser. No. 171,226

2 Claims. (Cl. 226—168)

This invention relates to magnetic tape recording and reproducing machines and particularly to tape driving and/or transducing means therefor.

Magnetic tape transports are usually arranged to tension a moving tape across one or more transducing heads so as to cause the tape and heads to be engaged with substantially unvarying pressure. However the length of unsupported tensioned tape near the heads has a tendency to vibrate longitudinally in response to scraping action of the tape against the heads, thus introducing undesirable frequency variations in the recorded or reproduced signal. Machines having such arrangements include the so-called "open loop" machines, in which the tape is tensioned between a capstan-and-pinch-roller assembly and a supply reel, with the heads between; and the so-called "closed loop" machines, in which the tape is looped around an idler and a capstan, both shanks of the tape loop being engaged with the capstan by means of two pinch rollers, and the heads being positioned between the idler and the capstan. The shorter the length of tape is between the capstan and the idler, the higher the frequency of the scraping vibration is, and for some uses the vibration frequency can be made to lie outside a range in which it would be objectionable. Such vibration is never completely eliminated and in other applications is objectionable.

Some attempts have been made to establish a so-called "zero-loop" arrangement, in which the tape is looped around a large capstan and is everywhere supported thereby in the loop; while the heads are caused to engage the supported segment of tape and to compress it against the capstan. This arrangement is subject to the same disadvantages as are magnetic drum recorders, in that eccentricities of the capstan (drum) and variations in the thickness of the tape, or bulges caused by foreign matter (dust, etc.), cause the head to bounce and thump, and the constant pressure relationship between the head and tape is destroyed.

Accordingly, it is an object of the present invention to provide a transducing apparatus in which substantially constant pressure is maintained between the head and tape without longitudinal vibration of the tape.

It is another object of the invention to provide a zero-loop transducing and tape driving apparatus in which substantially constant velocity and tension is maintained in the portion of tape at the transducing head.

It is still another object of the invention to provide a tape driving and transducing apparatus suitable for use in a restricted area and characterized by improved fidelity of performance and operation, the apparatus being constructed of economically manufactured parts and adapted for ready and accurate interchangeability.

In accordance with the invention, a tape is guided to and away from a rotating drum, which may be a drive capstan. The tape is tensioned on both sides of the drum to ensure frictional engagement between the tape and drum. One or more transducing heads are mounted to engage the segment of tape that is on the drum, and the head mountings are spring loaded or otherwise adapted to ensure constant pressure between the heads and tape. The cylindrical surface of the drum is formed of a layer of relatively hard elastomer. Thus the tape is coupled to the mass of the drum and is unable to vibrate longitudinally. At the same time, variations in tape thickness, and other irregularities, have the effect of moving the distortable elastomer rather than the head, because the mass of elastomer that is under the pressure of the head is very much less than the mass of the head and the movable parts of the head mounting.

Other objects and advantages will be explained in the following specification, considered together with the accompanying drawings, in which.

Figure 1:
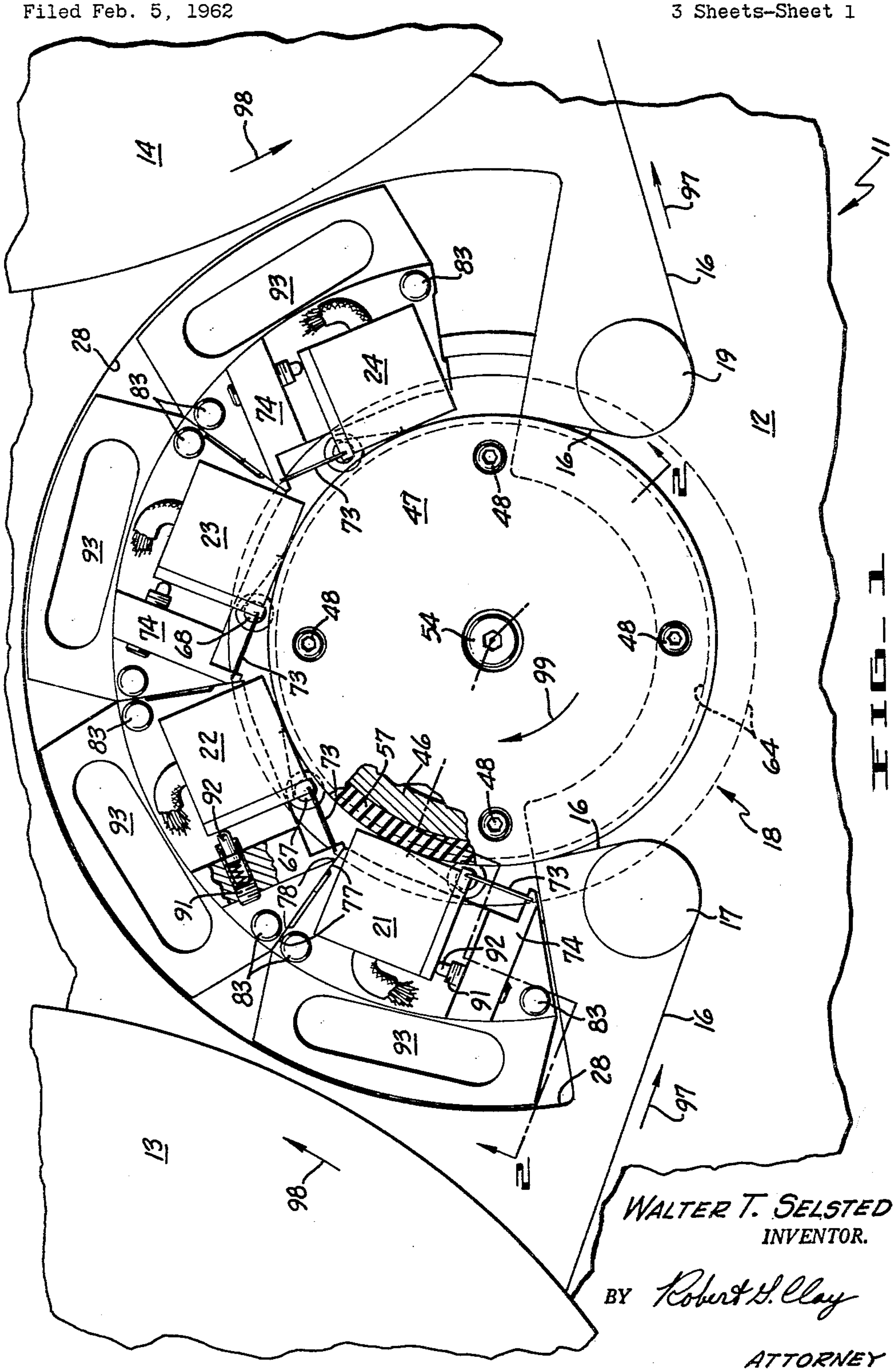
FIGURE 1 is a broken-away plan view of part of a tape transport including a transducing apparatus constructed in accordance with the invention.

Referring now to the drawings, and particularly to FIGURE 1 there is shown a portion of a tape transport 11, including a top plate 12 and supply and take-up reels 13 and 14 for storing and receiving a tape 16. The tape 16 coming from the supply reel 13 is guided around a guide member 17, thence around a rotating drum 18, which in this example is a driven capstan, and thence around a guide 19 to the take-up reel 14. The tape 16 is tensioned on either side of the capstan 18 by means well known in the art, as for example, by controlling the torques individually applied to the reels 13 and 14. A number of transducing heads 21, 22, 23 and 24 are adjustably mounted on the top plate 12 to engage the tape 16 at the capstan 18.

Figure 2:
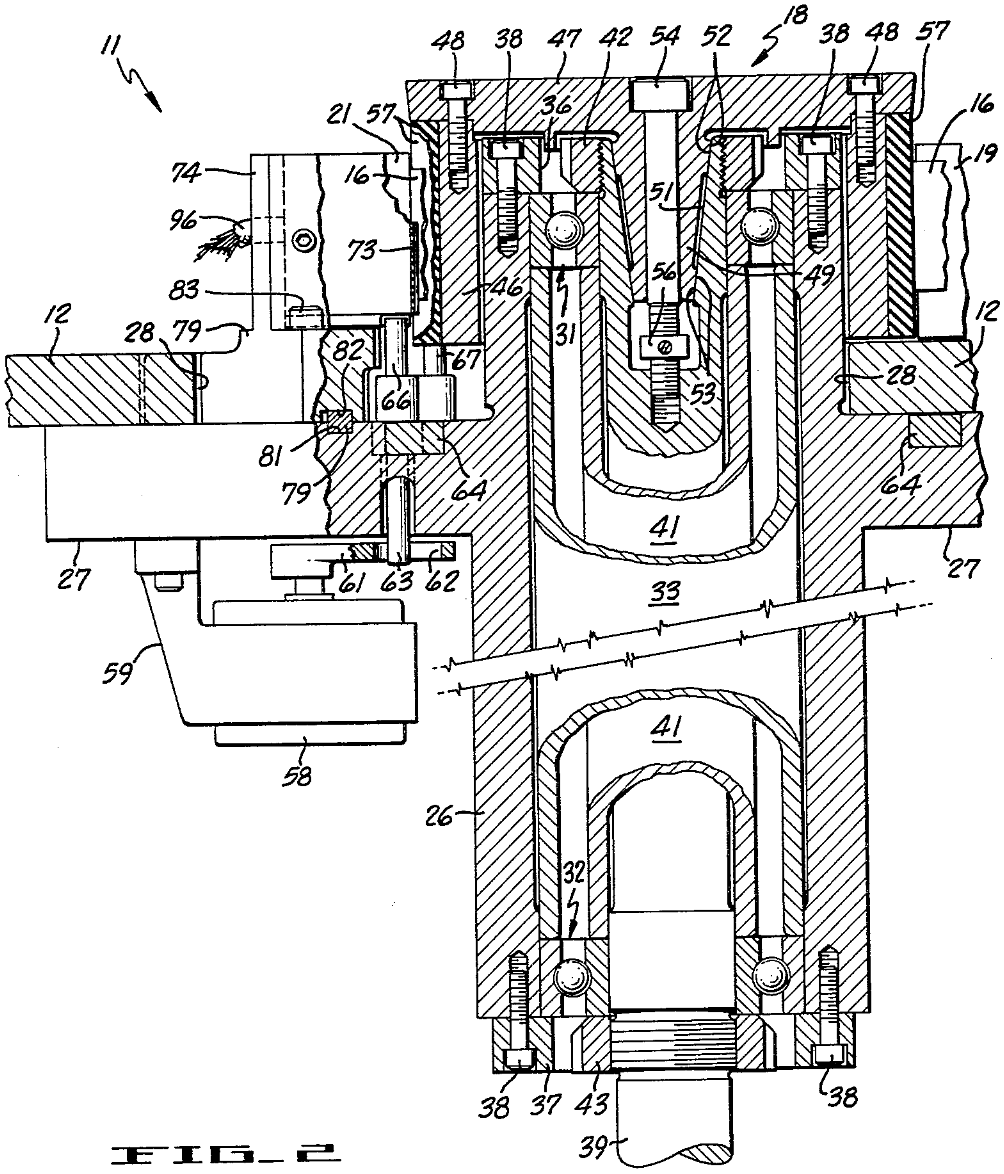
FIGURE 2 is a fragmentary cross-sectional elevation view taken substantially on the plane of lines 2—2 of FIGURE 1.

The construction and mounting of the capstan 18 is shown in FIGURE 2. A capstan mounting element 26, formed as a hollow cylinder having a peripheral flange 27, is mounted by the flange to the underside of the top plate 12 as by bolts (not shown). A portion of the flange 27 and an upwardly extending cylindrical portion of the element 26 are exposed through an opening 28 formed in the top plate 12. Within the element 26, upper and lower capstan bearing assemblies 31 and 32 are mounted, as by means of a spacing sleeve 33; and the assembly is retained by upper and lower retaining rings 36 and 37 that are coupled to the upper and lower ends of the element 26 as by fasteners 38. A capstan shaft 39 is mounted within the bearing assemblies 31, 32, the inner races being spaced apart by a sleeve 41 surrounding the shaft. For retaining the assembly of shaft 39, sleeve 41 and bearings 31, 32 together, upper and lower retaining nuts 42 and 43 are threaded on the shaft 39. The vertical position of the shaft can be adjusted with extreme accuracy by manipulation of the nuts 42 and 43. Furthermore, the threads of the two nuts are of different pitches, so that when turned tight they operate as locking nuts. The capstan is rotated as by motive means (not shown) operating on the lower end of shaft 39.

When the capstan 18 is mounted on the shaft 39, it is desirable to be able to quickly remove the capstan as a preliminary to removal or interchange of the heads without introducing maladjustments in the vertical or centralized positioning of the capstan with respect to the shaft. Accordingly, the capstan is constructed as a cylindrical ring member 46 concentrically mounted on an upper disc 47 as by means of bolts 48. The ring 46 and disc 47 might be manufactured as a single integral part, but are easier to machine if made separately, because the disc 47 has a central downwardly extending conical mounting portion 49, which fits within a corresponding conical recess 51 centralized in the upper end of shaft 39. The portion 49 may be keyed to the shaft if desired. The adjacent portions of the shaft and portion 49 are provided with accurately machined gage surfaces 52 and 53, and are elsewhere relieved, so that quick and accurate centralized re-positioning of the capstan on the shaft is easily effected. The capstan and shaft are retained together by means of a bolt 54 axially piercing the capstan and threaded into the shaft. The bolt 54 is retained on the capstan, when the capstan is removed from the shaft, as by means of a collar 56.

The capstan cylindrical member 46 serves as the base or mounting member for a cylindrical capstan surface layer 57 made of elastomeric material, such as rubber, for engaging the tape 16.

As will be explained later, means are provided for temporary retraction of the heads from contact with the capstan; and these means include, as shown in FIGURE 2, a solenoid 58 mounted as by a bracket 59 on the underside of the flange 27. The solenoid has an operating arm 61 in which is formed a slot 62 engaging a pin 63 that extends downwardly from a ring 64. The ring 64 is set in the upper surface of the flange 27, concentric with the capstan 18. The arrangement is such that energization and de-energization of the solenoid 58 causes the ring 64 to rotate in one direction or the other for moving the various heads between operating and retracted positions. The ring 64 has a number of upwardly extending head-retracting pins 66, 67, 68, and 69, one for each of the heads 21—24.

Figure 3:
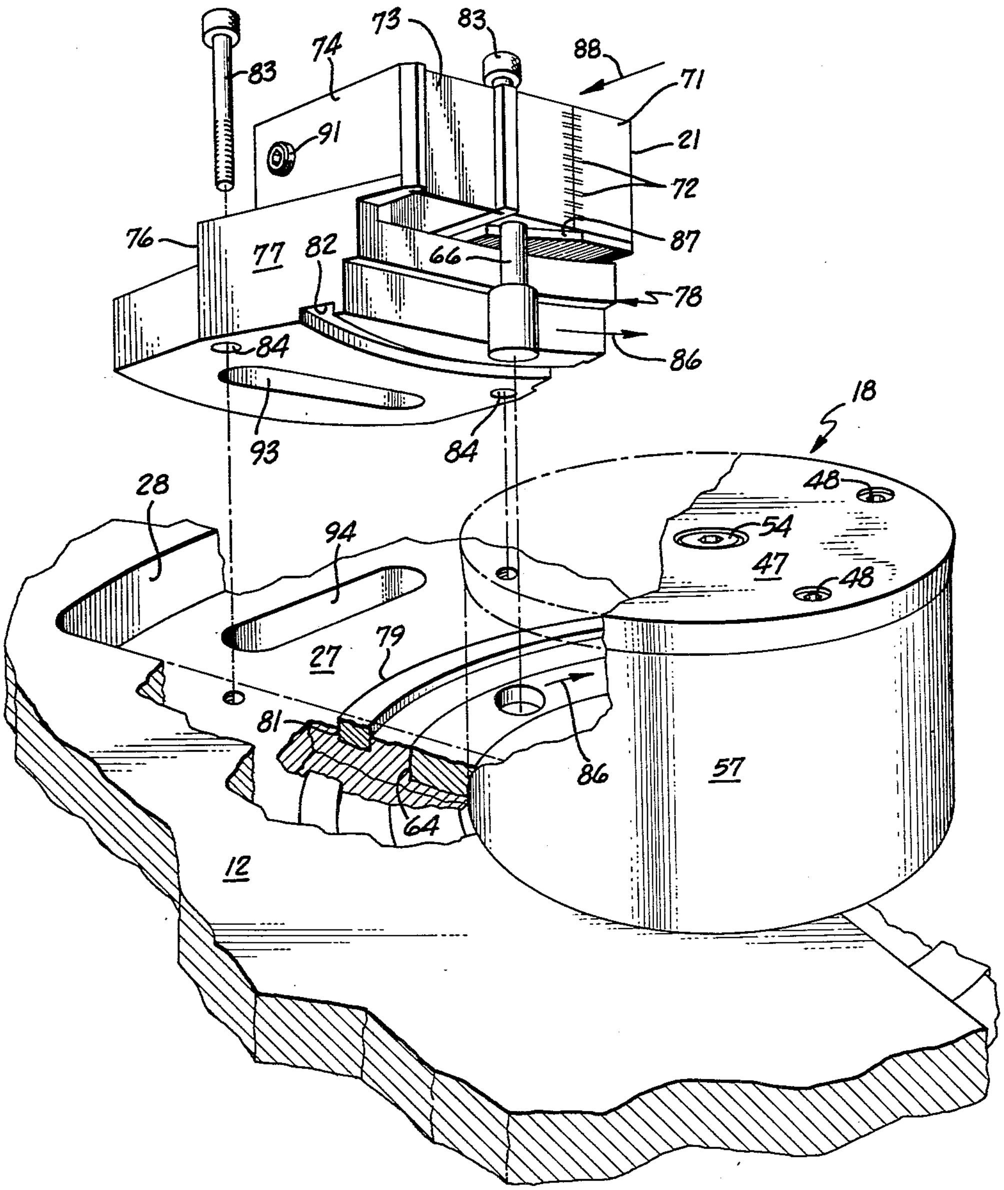
FIGURE 3 is an exploded perspective view of a portion of the apparatus shown in FIGURES 1 and 2.

The construction and assembly of the transducing heads is illustrated in FIGURE 3. The representative head 21 has a flat face 71 in which are set a number of different transducing elements 72 corresponding to the number of magnetic tracks to be recorded on the tape. The head 21 is mounted on a leaf spring 72 extending from a mounting block 74 in a direction corresponding to the direction of rotation of the capstan 18 (clockwise in FIGURES 1 and 3) so that rotation of the capstan tends to drag the head 21 away from the mounting block 74. The block 74 in turn extends upwardly from a base member 76, which is especially adapted for accurate positioning of the head with respect to the capstan and the other heads, as follows.

Each base member 76 is formed as a wedge with angled side faces 77 and 78 (see particularly FIGURE 1). In the assembled positions the faces 77–78 lie on radial planes of the capstan 18. These faces are furthermore accurately machined as gage faces so that in the assembled position each of the base members bears against the adjacent base members, with the result that the transducing elements 72 of the various heads are always equi-angularly spaced from one another, and even when taken apart, can be reassembled and spaced precisely as before.

To provide the base members 76 with accurate positioning radially from the capstan, a positioning ring 79 is mounted in a conforming groove 81 in the flange 27 and concentric to the capstan. The ring 79 projects above the surface of the flange 27; and each base member 76 has a conforming groove 82 for engaging the ring 79. Actually the groove 82 is made with some tolerance so as to fit loosely on the ring, and the radially more inward confronting faces of the ring and groove 82 are accurately machined as gage surfaces, these being the faces that are naturally engaged when the apparatus is assembled with the spring 73 pushing the member 76 away from the capstan.

To assembled the heads, first the head 21 is mounted on the ring 79 and is secured by means of bolts 83 fitting loosely in holes 84 in the member 76 and threaded into the flange 27. The looseness of the bolts in the holes 84 permits some degree of adjustment so that the radially most inward confronting faces of the ring 79 and groove 82 can be brought into accurate engagement. However, when the bolts 83 are subsequently tightened, the head is firmly mounted. The second head 22 is then mounted in like manner, except that it is slid circumferentially on the ring to engage the adjacent gage faces 77 and 78 before the bolts 83 are tightened. The other heads are mounted in a similar manner. When all of the heads are mounted in this way, they are positioned with extreme accuracy, solidly against the ring 79 and against one another, and the angular spacings between the transducing elements 72 of the respective heads always are identical.

When it is desired to retract the heads from the capstan, as for threading the tape, or for fast forward or rewind play of the machine, or for preventing the heads from inducing a permanent "set" in the rubber coating 57 of the capstan during inoperation of the machine, the ring 64 is rotated e.g. in a clockwise direction as shown by arrows 86 in FIGURE 3, thus causing clockwise motion of the pin 66. This pin engages a cam 87 attached to the bottom of the head 21, forcing the head away from the capstan as shown by the arrow 88. All of the heads are thus withdrawn at once. The solenoid may be arranged to cause engagement of the heads upon energization, and retraction of the heads upon de-energization, so as to "fail safe."

In FIGURE 1 there is shown an additional spring means for the head 22, comprising a hollow screw member 91 threaded through the block 74 and having a spring-loaded stud 92 projecting therefrom and bearing against the head 22 remote from the leaf spring 73. This arrangement provides a degree of adjustment for the pressure with which the head bears against the tape and capstan.

Openings 93 and 94 are provided in the base member 76 and the flange 27 respectively, for the mounting of mating electric plug and socket connectors (not shown), by means of which electric coupling is made to lead wires 96 of the head.

In operation, the tape 16 is moved (arrows 97) from the supply reel to the take-up reel (arrows 98) by the capstan 19 (arrow 99), while the springs means 73 and 91 cause the heads to engage the tape with substantially constant pressure. The tape in contact with the rubber surface 57 of the capstan is effectively coupled thereto in such a way that longitudinal vibrations do not occur. The mass of the tape alone is not the only mass that would have to be moved by longitudinal vibrations as in open or closed loop machines; also the coupled mass of the capstan and layer 57 would have to be moved. But in the present invention these coupled masses are too great, and as a result the scraping effect of the tape on the head produces no longitudinal vibrations. On the other hand, when a variation in tape dimension (e.g., increased thickness) comes between the head and the layer 57, it is the elastomer that is moved radially inward rather than the head radially outward. The mass of elastomer that is under compression from the head is substantially less than the mass of the head, and of course the resilient restoring forces of the elastomer and the head are identical because they are balanced in opposition to one another. Consequently it is the elastomer that must move. Likewise after distortion, the elastomer restores itself more quickly than the more massive head would be able to do.

It has been found desirable to use an elastomer having the greatest possible hardness, with the limitation that such hardness should not be obtained by destroying the ability of the elastomer to recover its shape after deformation. One way of obtaining extreme hardness of an elastomer is to load it with filler material. However beyond a certain point this filler material causes a hysteresis effect in the elastomer, i.e., slows the recovery of the composition after distortion. In practice, an elastomer such as rubber, having a hardness of from 58–80 durometers, and applied in a layer of from $\frac{1}{16}$ to $\frac{1}{8}$ inch thick, has been used with satisfactory effect.

Thus, there has been described a transducing apparatus including a rotating drum, which may be a driving capstan, having an elastomeric surface for supporting a tape against longitudinal vibration. Means are provided to cause frictional engagement of the tape and drum, and transducing heads are mounted as by springs to engage the supported portion of tape with substantially constant pressure. The elastomer that is pressurized by the head has lower mass than the head, and variations in the thickness of the tape cause distortion and rapid recovery of the elastomer rather than displacement of the head, with the result that more nearly constant pressure between the head and tape is achieved.

What is claimed is:

1. A zero-loop transducing apparatus for a moving tape, comprising:
resilient backing means mounted for engaging and moving with said tape through a predetermined zone along the path of said tape;
means for holding said tape and backing means in pressurized frictional engagement while passing through said predetermined zone; and
transducing means mounted for bearing with predetermined pressure against said tape opposite said backing means and within said predetermined zone;
said backing means being composed of an elastomer having a hardness of from fifty to eighty durometer.

2. A zero-loop transducing apparatus for a moving tape, comprising:
a rotating capstan;
a layer of resilient tape backing material mounted on the cylindrical surface of said capstan for engaging and moving with said tape through a predetermined zone along the path of said tape;
said backing material being an elastomer of 50–80 durometer hardness;
means for tensioning said tape on either side of said zone and for thereby holding said tape and backing material in pressurized frictional engagement while passing through said predetermined zone;
transducing means and resilient mounting means for causing said transducing means to bear with predetermined pressure against said tape opposite said backing material and within said predetermined zone.

References Cited in the file of this patent

UNITED STATES PATENTS

| | | |
|---|---|---|
| 2,675,973 | Reed et al. | Apr. 20, 1954 |
| 2,747,025 | Selsted | May 22, 1956 |
| 2,838,314 | Selsted | June 10, 1958 |
| 2,866,855 | La Forest | Dec. 30, 1958 |
| 2,987,233 | Selsted | June 6, 1961 |
| 3,029,032 | Reed | Apr. 10, 1962 |
| 3,040,135 | La Forest | June 19, 1962 |

UNITED STATES PATENT OFFICE

CERTIFICATE OF CORRECTION

May 5, 1964

Patent No. 3,131,844

Walter T. Selsted

It is hereby certified that error appears in the above numbered patent requiring correction and that the said Letters Patent should read as corrected below.

Column 4, line 36, for "capstan 19" read -- capstan 18 --; same column 4, line 69, for "58-80 durometers" read -- 50-80 durometers --.

Signed and sealed this 16th day of March 1965.

(SEAL)
Attest:

ERNEST W. SWIDER
Attesting Officer

EDWARD J. BRENNER
Commissioner of Patents